United States Patent [19]

Borcherding

[11] Patent Number: 5,165,095
[45] Date of Patent: Nov. 17, 1992

[54] VOICE TELEPHONE DIALING

[75] Inventor: Mark A. Borcherding, Austin, Tex.

[73] Assignee: Texas Instruments Incorporated, Dallas, Tex.

[21] Appl. No.: 590,249

[22] Filed: Sep. 28, 1990

[51] Int. Cl.$^5$ .................... G10L 9/08; H04M 1/30; H04M 1/66

[52] U.S. Cl. .................... 379/88; 379/189; 379/199; 379/216; 379/361; 381/42

[58] Field of Search ............ 379/88, 89, 189, 196, 379/197, 198, 199, 216, 355, 361, 386; 381/42, 43

[56] References Cited

U.S. PATENT DOCUMENTS

| | | | |
|---|---|---|---|
| 4,757,525 | 7/1988 | Matthews et al. | 379/89 |
| 4,853,953 | 8/1989 | Fujisaki | 379/88 |
| 4,922,538 | 5/1990 | Tchorzewski | 381/42 |
| 4,979,206 | 12/1990 | Padden et al. | 379/67 |

FOREIGN PATENT DOCUMENTS

| | | | |
|---|---|---|---|
| 0207756 | 12/1983 | Japan | 379/199 |
| 0299441 | 12/1988 | Japan | 379/199 |

OTHER PUBLICATIONS

"Speaker Verification: A Tutorial", J. M. Nail, *IEEE Communications Magazine*, Jan. 1990, pp. 42–48.

Lennig, "Putting Speech Recognition to Work in the Telephone Network", *Computer,* Aug., 1990, pp. 35–41.

Nakatsu, "Anser—An Application of Speech Technology to the Japanese Banking Industry", *Computer,* Aug., 1990, pp. 43–48.

*Primary Examiner*—Thomas W. Brown
*Attorney, Agent, or Firm*—L. Joy Griebenow; William E. Hiller; Richard L. Donaldson

[57] ABSTRACT

A method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent templates that are downloaded from a central database or by using speaker independent templates stored locally.

22 Claims, 2 Drawing Sheets

VOICE TELEPHONE DIALING

TECHNICAL FIELD OF THE INVENTION

This invention relates to telephone systems, and more particularly to a method of using a person's voice instructions for dialing.

BACKGROUND OF THE INVENTION

Speech recognition is one type of voice technology that provides a way for people to interact verbally with a computer. Speech recognition is an especially challenging technology because of the inherent variations of speech among different persons. Two types of approaches to speech recognition have evolved: speaker dependent and speaker independent.

Speaker dependent speech recognition uses a computer that has been "trained" to respond to the manner in which a particular person speaks. In general, the training involves one person speaking a sound to generate an analog speech input, converting the speech input into signal data, generating a template representing the sound, and indexing the template to appropriate response data, such as a computer instruction to perform an action. During real time applications, input data is compared to the user's set of templates and the best match results in an appropriate response.

Speaker independent speech recognition uses a computer that stores a composite template or cluster of templates that represent the same sound spoken by a number of different persons. The templates are derived from numerous samples of signal data to represent a wide range of pronunciations. Also, during real time applications, the matching process is more difficult the computer must interact with persons for whom it is not trained, and must accommodate different accents and inflections.

One application of speech recognition is in telephone systems. People may communicate directly with computers to perform simple tasks that would otherwise be done manually or with operator intervention. For example, voice recognition can be used for dialing so that the user need not remember, look up, or ask for a telephone number. Also, the user need not use his or her hands.

Some telephone applications use independent speech recognition for dialing. These applications are practical when the vocabulary is limited, such as when the user will simply vocalize numbers or select a command from a menu. However, such systems do not permit the caller to identify the called party with an identifier that is common to more than one destination, such as "my home". In such situations, the caller must use a unique identifier, such as the number of the called party. Also, speaker independent processing is expensive in terms of processing overhead.

On the other hand, a speaker dependent speech recognition system can accommodate a variety of destinations only by training the system to recognize a set of telephone numbers to be called by each user. This requires separate resources for each user and is expensive in terms of the physical device requirements. Also, the training process is prone to human error.

A need exists for a voice recognition method for dialing that minimizes processing complexity as well as training requirements.

SUMMARY OF THE INVENTION

One aspect of the invention is a method of using computer processing to dial a telephone. The caller is first identified, using voice recognition or some other means, so that a database containing speaker dependent templates of that caller may be accessed. These templates are downloaded from a central database to a local station in communication with the caller's telephone. A dial command spoken by the caller is then detected and a local database containing speaker independent speech recognition templates is accessed. The templates of this local database are compared to the dial command, so that dialing instructions can be recognized and executed. A destination identifier spoken by the caller is detected and the downloaded speaker dependent templates are accessed. The destination identifier is compared with these speaker dependent templates, and when a match is found, the destination telephone number is dialed.

A technical advantage of the invention is that a speech dialing system can be created and used efficiently in terms of both training during development and processing overhead during run time. The invention uses a combination of speaker independent and speaker dependent techniques. Dial commands are recognized with speaker independent processing, which reduces the need for training for each new caller. Destination identifiers are recognized with both speaker independent and speaker dependent processing. Speaker independent processing for destination identifiers that are commonly used eliminates unnecessary training. Speaker dependent processing for a more arbitrary vocabulary of destination identifiers eliminates unnecessary processing complexity. Both types of destination identifier processing may be performed simultaneously, which minimizes the time required.

DETAILED DESCRIPTION OF THE INVENTION

Figure 1:
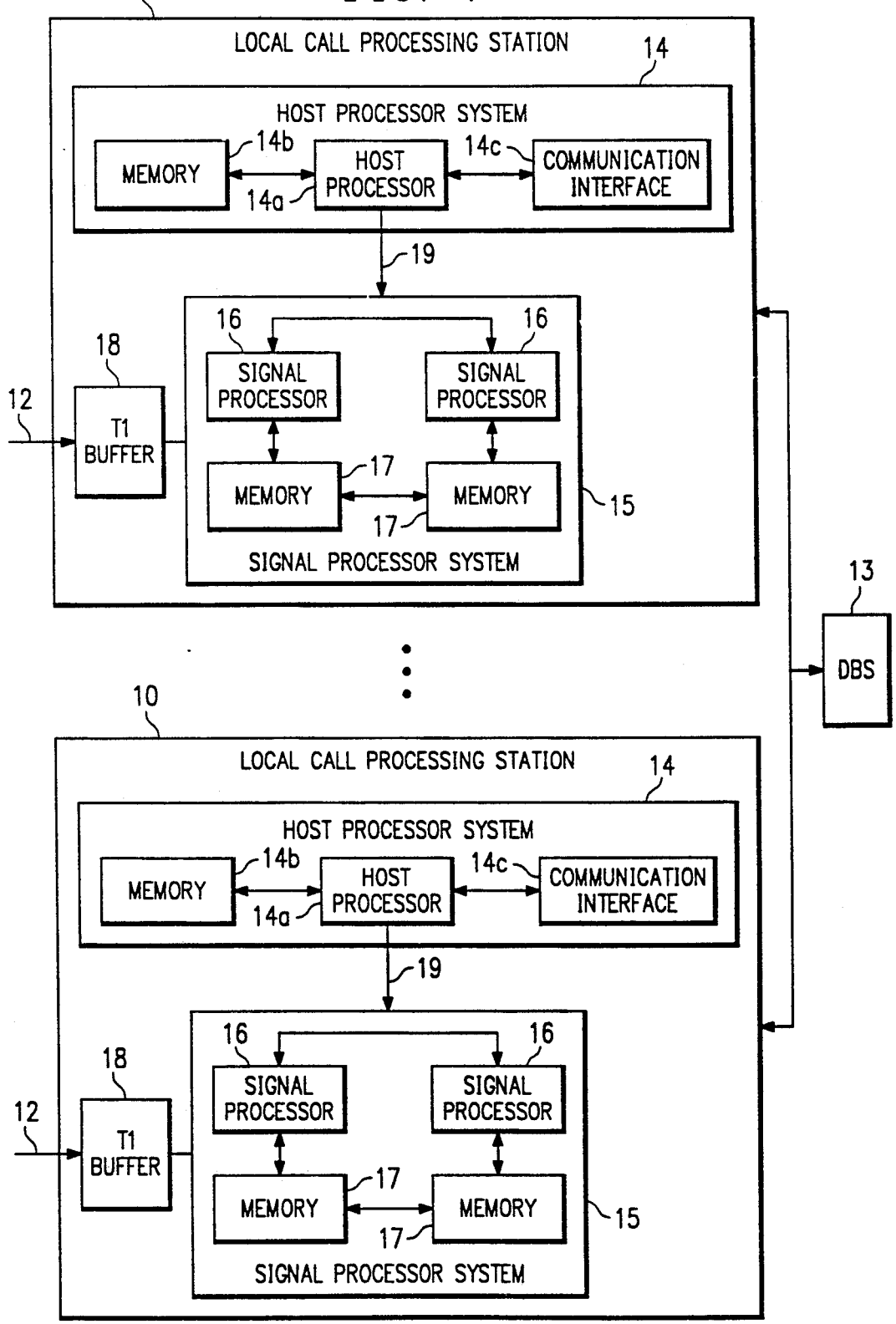
FIG. 1 is a block diagram of a voice recognition telephone system.

As indicated above, an object of the invention is to permit a person to use a telephone to call a number verbally, without actually knowing the number. The invention uses a combination of speaker independent and speaker dependent techniques. To call a number, the caller speaks a directive consisting of a dial command followed by a destination identifier. As explained below, these spoken words are recognized by the voice recognition programming (VRP) of the invention, with the dial command being recognized with speaker independent templates and the destination identifier being recognized with either speaker dependent or independent templates. Once the dial command is recognized, the VRP translates the dial command to instructions to execute a dialing task and searches a data base to recognize the destination identifier so that it may be matched to a telephone number.

The dial command is one of a predetermined vocabulary of words or phrases, each represented by a speaker independent template. Typical dial commands are: call, call my, phone, dial, telephone. The template for each dial command forms a signal data model, which conforms to a number of patterns that were input during a training process. Once the template for a command is formed, any spoken sound that is reasonably close will be recognized as that command. Ideally, the template will recognize the same command spoken by a large number of users and tolerate differences in pronunciation. Various speaker independent techniques for generating templates and performing a matching process are known in the art of speech recognition.

A dial command program is written that will match the caller's spoken dial command, usually no more than two words, with an item on a dial command list. The list of dial commands can be provided to the user, or if the list is sufficiently inclusive, can simply be assumed to include whatever dial command a caller may use.

The destination identifier is a unique word or phrase that is assigned to a callee and indexed to the callee's telephone number. As explained below, the destination identifier may be represented by either speaker independent or speaker dependent templates, according to the scope of the identifier.

An example of a caller's voice dialing directive is "Call home". The dial command is "call" and the destination identifier is "home". In this example, "home" is associated with a different number for each user, but is a word likely to be used as a destination identifier by many callers. Therefore, it is practical to develop a speaker independent template for this word.

A second example of a caller's directive is "Call Uncle Joe". Again, the dial command, "call", is speaker independent. The destination identifier, "Uncle Joe", is unique to the caller; only a limited number of callers have an Uncle Joe. Thus, "Uncle Joe" is speaker dependent, and the caller will train his or her telephone system to recognize that phrase.

In the above examples, the easiest VRP implementations are with isolated word recognition, in which the caller is instructed to pause between the dial command and the destination identifier. However, more complicated processing algorithms using connected word or continuous speech recognition may be used, in accordance with known techniques for differentiating sounds.

FIG. 1 illustrates a voice telephone system with which the invention is used. The system comprises a number of local call processing stations 10 in communication with at least one telephone (not shown) via T1 lines 12. The telephones, which are used in typical fashion to receive voice signals, may be standard telephone equipment, with the essential characteristic being a means for detecting a caller's spoken words and converting them to digital form in real time. All local stations 10 are also in two-way communication with a database system 13.

Database system 13 stores customer records and voice recognition templates. As explained below, during real time applications, a local station 10 may request templates to be downloaded from database system 13. Typically, each caller subscribes to the database by providing a set of destination identifiers, each represented by a template and indexed to a telephone number.

Each local call processing station 10 has a host processor system 14 in communication with a signal processor system 15. The communication means between processor systems 14 and 15 is a bus line 19, conforming to any one of a number of recognized standards for binary communications, such as the 32-bit NuBus standard.

Host processor system 14 includes a host processor 14a and memory 14b. Host processor 14a is typically a general purpose processor, for example the 68030 manufactured by Motorola Corporation. Memory 14b includes program memory for storing instructions for host processor 14a, as well as memory for storing program routines and parameters to be downloaded to signal processor system 15. Host processor system 14 also has a communications interface 14c for communicating with database system 13.

Signal processing system 15 receives voice signal data via T1 line 12 and T1 buffer 18, according to telecommunications protocols. Signal processor system 15 executes program routines downloaded to it from host processor 14a. When execution of one program routine is complete, signal processor system 15 notifies host processor 14a, so that host processor 14a may download another routine. In practical applications, signal processor system 15 is a multi-processor, multi-tasking system, having a plurality of signal processors 16 and receiving input from multiple channels of T1 line 12.

Signal processors 16 are in communication with each other, which permits signal processor system 15 to perform more than one task simultaneously. Each signal processor 16 has its own memory 17, which is cross-coupled with a neighboring memory 17 to permit communications among signal processors 16. An example of a signal processor 16 is the TMS 320C30, manufactured by Texas Instruments, Inc. A suitable size for memory 17 for the application described herein is 250K×4 bytes. As explained below, memory 17 permanently stores certain speaker independent templates and also accepts additional speaker dependent templates downloaded from database system 13.

Telephone service tasks are allocated among signal processors 16. The programming of each signal processor 16 includes a call handler, so that more than one incoming call may be simultaneously processed. The processing may be different for each call depending on the scripts delivered from host processor 14a. The processing tasks of signal processing system 15, i.e., the functions to be performed by each signal processor 16, are represented by portions of an application program loaded to host processor system 11.

In the voice recognition applications, tasks are initiated by incoming calls. One example of a task is answering a telephone. Other tasks include dialing a number, listening to messages, recording messages, reaching an operator, etc. A more complete description of the use of the system of FIG. 1 for voice applications is set out in co-pending U.S. patent Ser. No. 570,171, entitled "Digital Signal Processing Control Method and Apparatus", also assigned to the assignee of the present invention.

In the following description, task allocation is between two signal processors 16, but more or fewer could be used, with different task allocations. A first signal processor 16 performs call handling tasks, such as phone answering, etc. A second signal processor 16 performs tasks in accordance with the invention, specifically caller identification and VRP, which are explained below in connection with FIG. 2. For VRP tasks, the programming of signal processor 16 includes standard algorithmic steps, such as feature extraction, word endpoint detection, and template matching.

Figure 2:
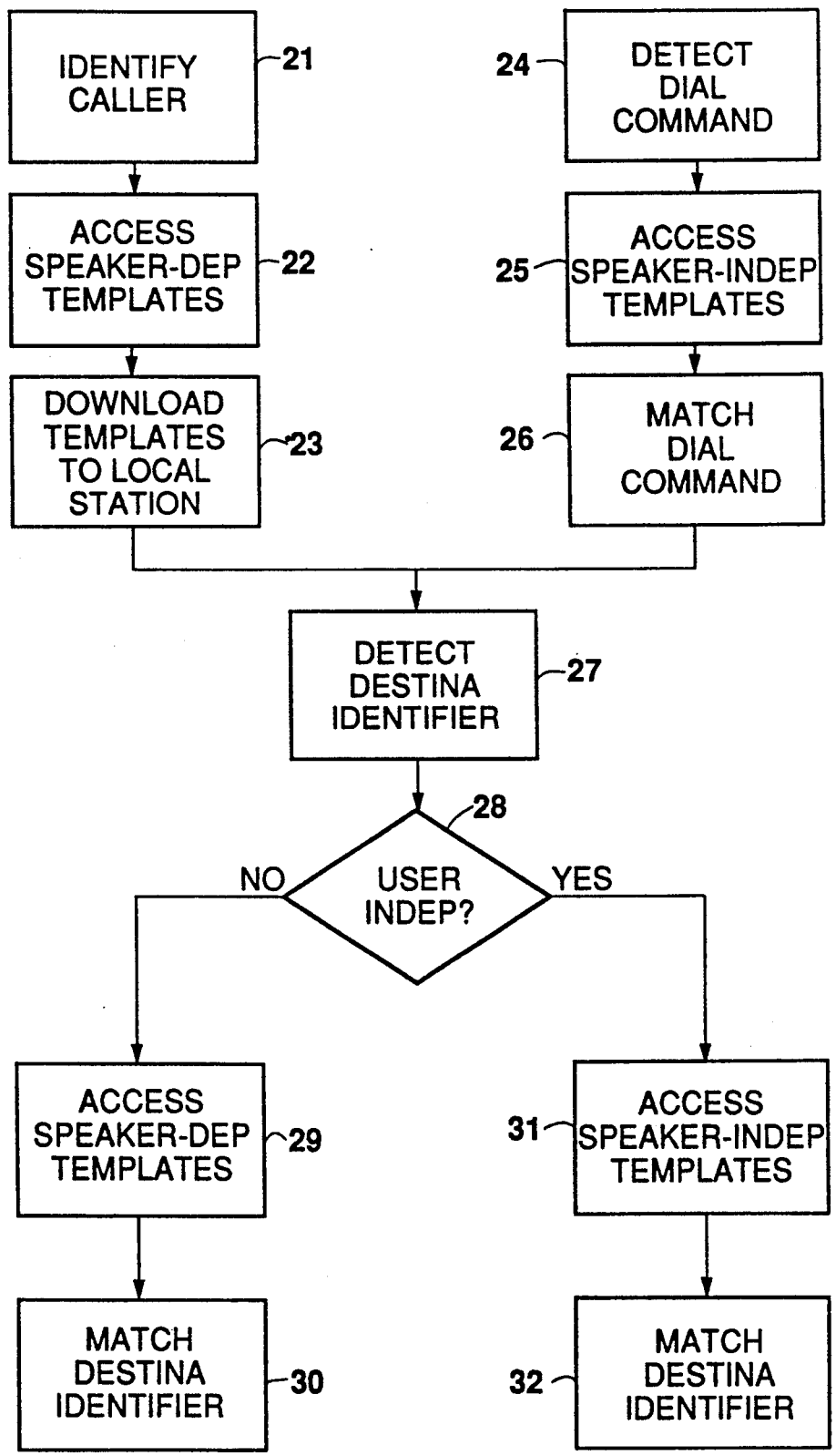
FIG. 2 illustrates the process of dialing a telephone number.

FIG. 2 illustrates the process of dialing using the VRP system of the invention. This is a real time application, during which the VRP runs in two modes. A first mode operates when the caller speaks a dial command or a speaker independent destination identifier. The recognition task is directed to speaker independent VRP that accesses a database available for all callers. A second mode operates when the caller speaks a speaker dependent destination identifier. The translation task is directed to speaker dependent VRP that accesses a database associated with the particular user.

Upon hearing a standard dial tone or other prompt, the caller pronounces a dialing directive. This directive has at least two parts: a start command and a destination identifier. Additionally, as explained below in connection with step 21, the dial command may be preceded by a spoken caller identifier.

In step 21, the VRP identifies the caller. This can be accomplished by various means, such as by decoding the originating telephone number and associating it with the caller, using a personal identification number with speaker independent recognition of numbers, or identifying the caller's voice with speaker dependent recognition.

In step 22, once the caller is identified, the VRP accesses a database containing speaker dependent templates. A set of templates associated with the particular caller is selected and identified. Typically, this set of templates is stored in database system 13, which is designed to accommodate and quickly access large amounts of data.

In step 23, the set of templates identified in step 22 is downloaded to the caller's local station 10.

In step 24, the VRP receives the signal data for the dial command. In a simple implementation of the invention, the VRP is programmed to provide the user with a limited set of valid dial commands. However, the invention is especially useful when an inclusive list of possible dial commands has been generated so that templates for many possible dial commands are available.

In step 25, the VRP accesses a set of speaker independent templates, which represent a number of possible dial commands. These templates are typically stored at local station 10, where they can be efficiently processed with application specific processors 16.

In step 26, the dial command is recognized, using speaker independent VRP.

As shown in FIG. 2, steps 21-23 and 24-26 may occur in parallel. This is one advantage of the invention, and is particularly useful when the VRP will perform functions other than dialing numbers. For example, instead of dialing a number, the caller may want to listen to messages from a particular person, who is identified by a spoken name. In this situation, the downloading of speaker dependent templates to recognize the name is useful even if the caller's directive is something other than a dial command.

In step 27, the VRP receives signal data representing the caller's destination identifier.

In step 28, VRP determines whether the destination identifier is speaker independent or speaker dependent. One way to make this determination is to compare the destination identifier with a set of speaker dependent templates in a unique database associated with the caller. If the caller's database does not contain the destination identifier, the VRP then attempts speaker independent recognition using a common database. As explained below, however, the determination of whether the destination identifier is speaker dependent or speaker independent may be performed implicitly.

Steps 29-32 involve recognizing the destination identifier, using either caller dependent or caller independent templates. Each template is indexed to a number to be dialed. Once the destination identifier is matched to a template it is then matched to the corresponding number for dialing.

In steps 29 and 30, for speaker dependent destination identifiers, the caller's unique set of templates is accessed and the destination identifier is recognized. For example, if the command is "call Uncle Joe", the caller's own set of speaker dependent templates is used. The speaker dependent templates are those downloaded from database system 13 in step 23.

In steps 31 and 32, for speaker independent words, a database that is common to a number of users is accessed and matched. For example, if the command is "Call home", speaker independent templates may be used for the recognition process. Once the word is recognized, the caller's identity is used to index the destination identifier to the caller's list of telephone numbers.

As shown in FIG. 2, speaker dependent steps 29 and 30 and speaker independent steps 31 and 32 may be simultaneously executed until either process finds a match. Thus, it is not necessary to explicitly determine whether the destination identifier is speaker independent or speaker dependent.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method of using voice recognition computer processing to direct a caller's telephone call to a called destination, comprising the steps of:
   identifying the caller;
   accessing a database containing speaker dependent speech recognition templates;
   downloading said speaker dependent templates from a central database to a local station in communication with said caller's telephone;
   detecting a dial command spoken by said caller;
   accessing a database containing speaker independent speech recognition templates;
   comparing said dial command to said speaker independent templates;
   detecting a destination identifier spoken by said caller;
   accessing a database containing speaker dependent speech recognition templates associated with said caller;
   comparing said destination identifier to said speaker dependent templates; and
   dialing an appropriate number in response to said comparing steps.

2. The method of claim 1, wherein said step of accessing a database containing speaker independent speech recognition templates further comprises downloading said templates to said local station.

3. The method of claim 1, further comprising the steps of comparing said destination identifier to a set of speaker independent templates.

4. The method of claim 1, wherein said step of identifying said caller is performed using identification numbers and speaker independent templates representing said numbers stored at said local station.

5. The method of claim 1, wherein said step of identifying said caller is performed by detecting the caller's spoken name and using speaker dependent templates.

6. The method of claim 1, further comprising the step of providing the caller with a set of permissible dial commands.

7. The method of claim 1, wherein said comparing steps are performed using dedicated signal processors of said local station.

8. A voice recognition system for dialing a telephone, comprising:
   a number of local database memories that store speaker independent voice recognition templates;
   a central database memory that stores sets of speaker dependent templates, each set associated with a caller, wherein each template represents a destination identifier;
   a local processing system programmed for identifying a caller, for accessing said central database memory to request a set of speaker dependent templates associated with said identified caller, for detecting a dial command spoken by said caller, for accessing said speaker independent voice recognition templates stored in at least one of said number of local database memories, for recognizing said dial command using said speaker independent templates, for detecting a destination identifier spoken by said identified caller, for recognizing a destination identifier using said speaker dependent templates and for dialing an appropriate number associated with said recognized destination identifier.

9. The system of claim 8, further comprising a communications system for downloading said set of speaker dependent templates to a local database.

10. The system of claim 8, wherein said local processing system comprises a host processing system and a signal processing system.

11. The system of claim 8, wherein said local database memories further store speaker independent templates for recognizing said destination identifier.

12. The system of claim 8, wherein said local processing system is programmed for recognizing said destination identifier by using speaker independent and speaker dependent templates simultaneously.

13. The system of claim 10, wherein said hose processing system is programmed to download said speaker dependent templates while said signal processing system matches said dial command.

14. A method of using voice recognition computer processing to direct a caller's telephone call to a called destination, comprising the steps of:
   identifying the caller;
   accessing a database containing speaker dependent speech recognition templates;
   downloading said speaker dependent templates from a central database to a local station in communication with said caller's telephone;
   detecting a dial command spoken by said caller;
   accessing a database containing speaker independent speech recognition templates;
   comparing said dial command to said speaker independent templates;
   detecting a destination identifier spoken by said caller;
   accessing a database containing speaker dependent speech recognition templates associated with said caller;
   simultaneously comparing said destination identifier to said speaker dependent templates and to said speaker independent templates; and
   dialing an appropriate number in response to said comparing steps.

15. The method of claim 14, wherein said step of accessing a database containing speaker independent speech recognition templates further comprises downloading said templates to said local station.

16. The method of claim 14, wherein said step of identifying said caller is performed using identification numbers and speaker independent templates representing said numbers.

17. The method of claim 14, wherein said step of identifying said caller is performed by detecting the caller's spoken name and using speaker dependent templates.

18. The method of claim 14, further comprising the step of providing the caller with a set of permissible dial commands.

19. A method of using voice recognition computer processing to direct a caller's telephone call to a called destination, comprising the steps of:
   a) identifying the caller;
   b) detecting a dial command spoken by said caller;
   c) performing the following substeps i) and ii):
      i) accessing a database containing speaker dependent speech recognition templates;
      ii) downloading said speaker dependent templates from a central database to a local station in communication with said caller's telephone; while performing the following substeps iii) and iv):
      iii) accessing a database containing speaker independent speech recognition templates;
      iv) comparing said dial command to said speaker independent templates;
   d) detecting a destination identifier spoken by said caller;
   e) accessing a database containing speaker dependent speech recognition templates associated with said caller;
   f) comparing said destination identifier to said speaker dependent templates; and
   g) dialing an appropriate number in response to said comparing steps.

20. The method of claim 19, wherein said substep iii) of accessing a database containing speaker independent speech recognition templates further comprises downloading said templates to said local station.

21. The method of claim 19, further comprising the step of providing the caller with a set of permissible dial commands.

22. The method of claim 19, wherein said step f) of comparing said destination identifier to said speaker dependent templates further includes a step of comparing said destination identifier to said speaker independent templates.

* * * * *